United States Patent
Jones et al.

(10) Patent No.: US 6,932,366 B2
(45) Date of Patent: Aug. 23, 2005

(54) AUTOMOTIVE CAMBER ADJUST MECHANISM

(75) Inventors: Robert Allen Jones, Canton, MI (US); Steve Scott Allen, Ann Arbor, MI (US); Scott D. Wareing, St. Peters, MO (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 10/065,786

(22) Filed: Nov. 19, 2002

(65) Prior Publication Data

US 2004/0094924 A1 May 20, 2004

(51) Int. Cl.[7] .............................................. B62D 17/00
(52) U.S. Cl. .............................. 280/86.751; 280/93.512
(58) Field of Search ....................... 280/86.751, 86.752, 280/93.51, 93.512

(56) References Cited

U.S. PATENT DOCUMENTS

| | | | |
|---|---|---|---|
| 2,684,253 A | | 7/1954 | Leighton |
| 3,273,909 A | | 9/1966 | Muller |
| 3,422,918 A | | 1/1969 | Musser |
| 5,348,334 A | * | 9/1994 | Giltinan ............... 280/124.138 |
| 5,513,874 A | * | 5/1996 | Mori ....................... 280/93.51 |
| 6,027,130 A | * | 2/2000 | Kawabe et al. ....... 280/124.135 |
| 6,089,582 A | * | 7/2000 | Hasshi .................. 280/93.512 |
| 6,224,075 B1 | | 5/2001 | McIntyre |
| 6,293,724 B1 | | 9/2001 | Spears et al. |

* cited by examiner

*Primary Examiner*—Faye M. Fleming
(74) *Attorney, Agent, or Firm*—Gary Smith

(57) ABSTRACT

An automotive suspension assembly 10 is provided, including an upper control arm 20, a lower control arm 22 and a knuckle 24. The lower control arm 22 is rotatably affixed to the knuckle 24 by way of a lower mount joint 29 rotatably engaging a lower rotational joint 28. The upper control arm 20 is rotatably affixed to the knuckle 24 by way of an upper mount joint 36 rotatably engaging an upper rotational joint 34, the upper mount joint 36 including an upper control arm shaft 38 positioned within a slotted guide 40 such that the camber is adjustable by adjusting the position of the upper control arm shaft 38 within the slotted guide 40.

20 Claims, 4 Drawing Sheets

AUTOMOTIVE CAMBER ADJUST MECHANISM

BACKGROUND OF INVENTION

The present invention relates generally to an automotive suspension assembly and more particularly to an improved apparatus and method of adjusting wheel camber in an automotive vehicle.

The ride and handling characteristics of an automobile often center on the interface between the vehicle and the road. This interface, the vehicle tires contact with the road, manages the input of forces and disturbances from the road, and is the final link in the driver's chain of output commands. Tire characteristics, linkage mechanisms, and vehicle geometry are therefore key factors in the effect the road has on the vehicle, and in the effectiveness of the output forces that control vehicle stability and cornering characteristics. Design and adjustment of these elements allows for improved control and performance of the vehicle.

One such design element is known as camber. Camber is the lateral inclination of the wheel. If the wheel leans out at the top, away from the vehicle, it is said to have a positive camber angle. With a negative camber angle, the wheel leans inward at the top. Zero camber is defined as having the wheel/tire perpendicular to the road surface. Changes in camber can occur when the vehicle body leans during a turn and when the wheels move vertically through jounce and rebound. A wheel set at a camber angle produces "camber thrust," which is a lateral force generated in the direction of the lean. Camber angle can be utilized to maximize cornering forces by keeping the outside tire upright or at a slightly negative camber angle as the body leans to the outside of the turn. Camber can also be utilized to minimize lateral movement, or tire scrubbing, at the contact patch. Camber change can also compensate for body roll to keep the outside wheel from lean away from the turn. Tire scrubbing (changes in the tread) can be minimized by good suspension design, and camber changes should be minimal as well. Rear wheel camber changes can augment cornering forces, and they can influence the balance between oversteer and understeer.

When camber specifications are determined during the design stage, a number of factors are often taken into account. The engineers often account for the fact that wheel alignment specifications used by alignment technicians are for a vehicle that is not moving. On many vehicles, camber changes with different road speeds. This is because aerodynamic forces cause a change in riding height from the height of a vehicle at rest. Because of this, riding height is commonly checked and problems corrected before setting camber. Camber specs are set so that when a vehicle is at highway speed, the camber is at the optimal setting for minimum tire wear.

Despite the often significant effects of camber on vehicle performance, often adjustments in camber are not easily implemented after vehicle assembly. Modifications to vehicle design, alterations in performance over vehicle lifetime, replacement of automotive components with non-OEM parts all can play a factor in altering the benefit of a camber angle set during original vehicle design. It would, therefore, be highly desirable to have a control arm assembly that allowed for a simple and effective adjustment to camber. Such an assembly would provide both improved maintenance of automotive performance, but could be utilized to provide increased design flexibility as well.

SUMMARY OF INVENTION

It is, therefore, an object of the present invention to provide an automotive suspension assembly with adjustable camber. It is a further object of the present invention to provide an automotive suspension system that provides a simple and effective method for adjusting camber.

In accordance with the objects of the present invention, an automotive suspension assembly is provided. The automotive suspension assembly includes a knuckle, an upper control arm, and a lower control arm. An upper cross-axis ball joint, mounted to the steering arm, is rotatably affixed to an upper control arm shaft. The upper control arm shaft is positioned within a slotted guide formed within the upper control arm. The upper control arm shaft is movable within the slotted guide to allow uni-directional displacement between the upper control arm and the knuckle such that the camber of the automotive suspension can be adjusted.

Other objects and features of the present invention will become apparent when viewed in light of the detailed description of the preferred embodiment when taken in conjunction with the attached drawings and appended claims.

DETAILED DESCRIPTION

Figure 1:
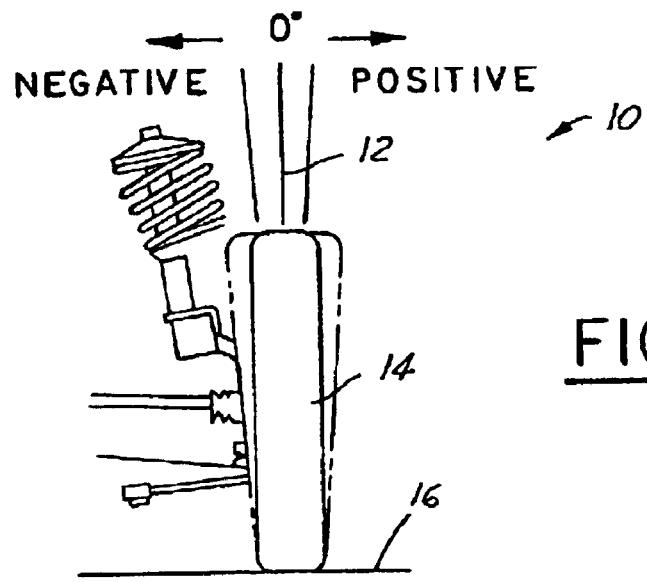
FIG. 1 is a front view illustration of an embodiment of an automotive suspension assembly in accordance with the present invention.

Referring now to FIG. 1, which is an illustration of an automotive suspension assembly 10 in accordance with the present invention. The automotive suspension assembly 10 is intended to be utilized in a wide variety of vehicles for a wide variety of specific configurations. Although the present invention can be utilized on a variety of specific suspension designs front and rear, in one embodiment it is contemplated that the present invention be utilized on an automotive rear suspension.

Figure 2:
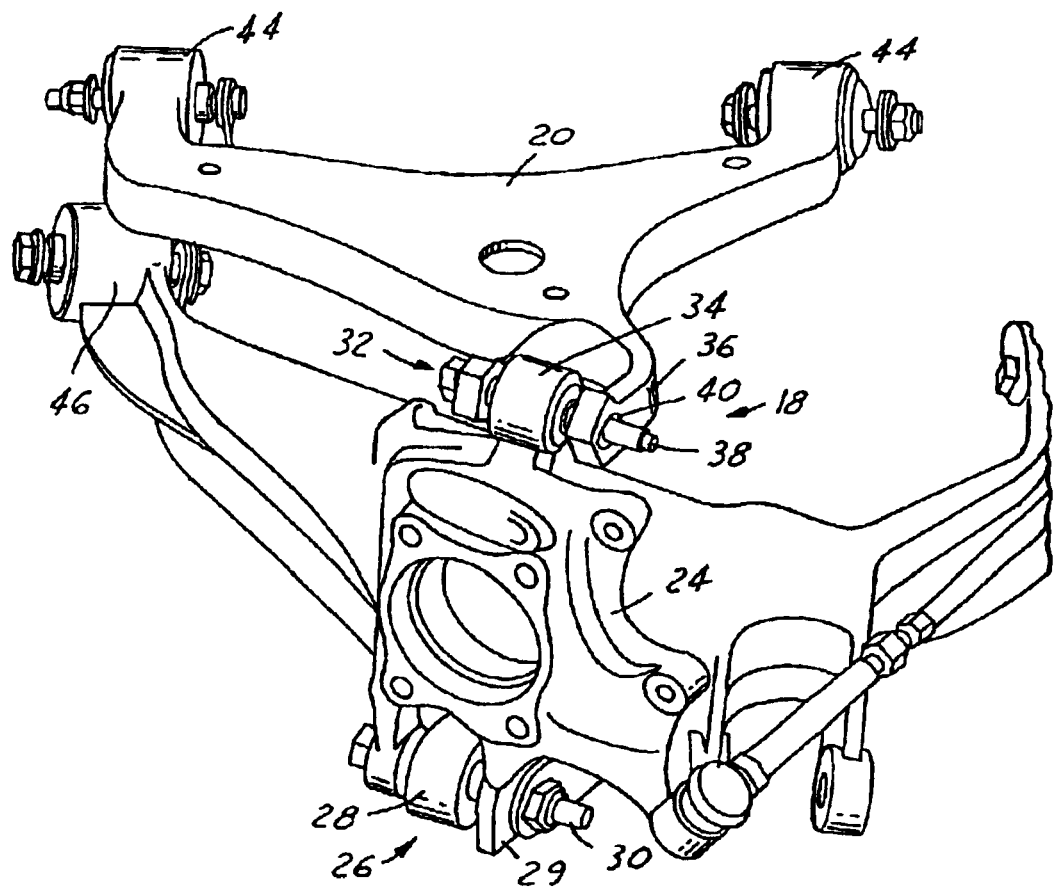
FIG. 2 is an illustration of an embodiment of an automotive suspension assembly in accordance with the present invention.

The automotive suspension assembly 10 allows for adjustment of the camber 12 of the vehicle tire 14. Camber 12 is the angle of the tire 14 in relation to the road surface 16. The camber 12 may be positive or negative based upon the direction towards or away from the vehicle. It is often highly desirable to have the camber 12 of a vehicle adjustable such that it can be fine tuned after assembly or modified due to alteration of the vehicle. The present invention, therefore, provides an automotive suspension assembly 10 with a camber adjust mechanism 18 (See FIG. 2).

The automotive suspension assembly 10 includes an upper control arm 20, a lower control arm 22, and a knuckle 24. The lower control arm 22 is rotatably attached to the knuckle 24. Although a variety of lower rotational attachments 26 are contemplated, one embodiment contemplates the use of a lower cross axis ball joint 28 orientated substantially along the vehicle fore-aft axis and mounted to the lower control arm 22. In other embodiments, however, alternate rotational attachments are contemplated. The lower cross-axis ball joint 28 allows the knuckle 24 to move in a vertical direction relative to the vehicle while still receiving support from the lower control arm 22. The lower rotational attachment 26 can further include a lower control arm shaft 30 mounted to a lower mount joint 29 such as a clevis, a double shear attachment, or a mount joint, formed as a portion of the knuckle 24. Although the lower control arm shaft 30 may take on a variety of configurations, it is illustrated as a bolt fastener assembly.

Figure 3:
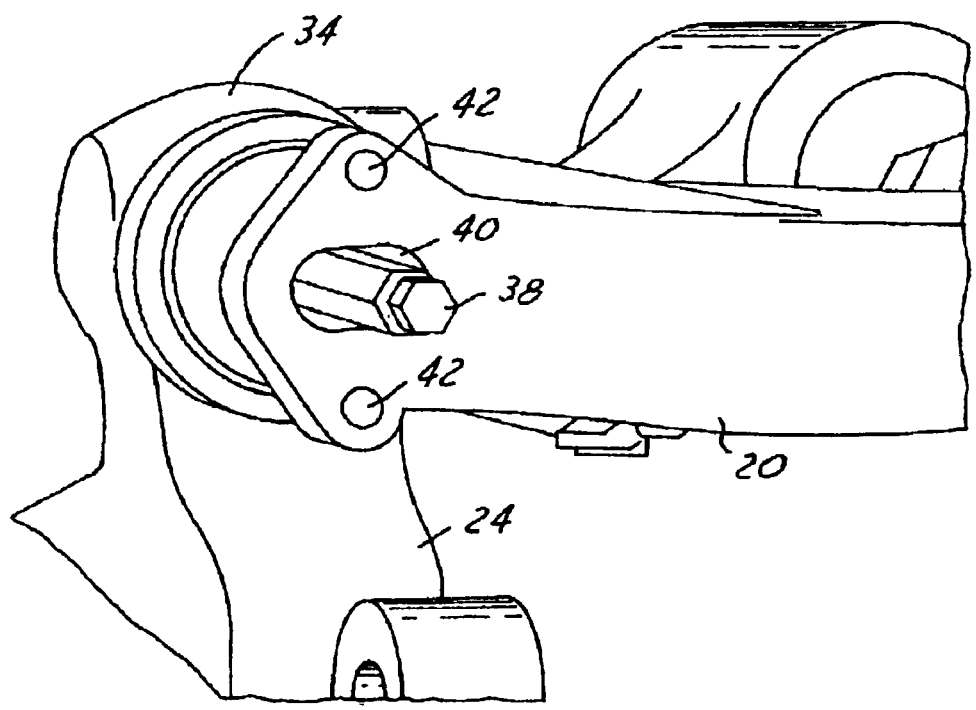
FIG. 3 is a detail illustration of the an automotive suspension assembly illustrated in FIG. 2.
Figure 6:
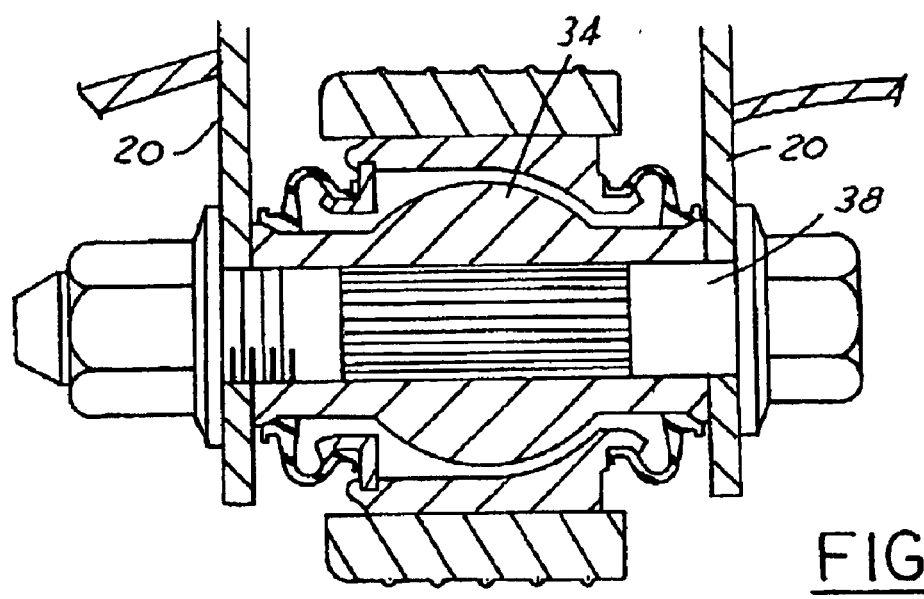
FIG. 6 is an illustration of a ball-joint for use in the automotive suspension assembly shown in FIG. 1.
Figure 7:
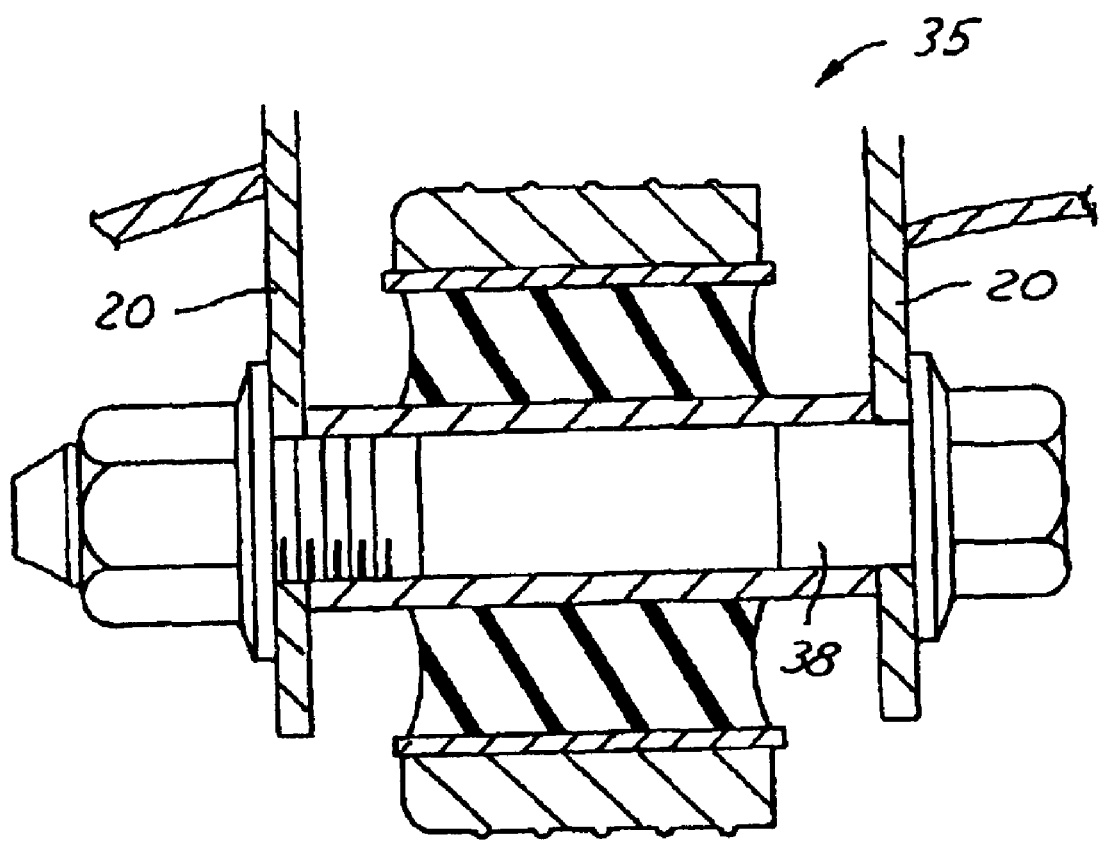
FIG. 7 is an illustration of a bushing joint for use in the automotive suspension assembly shown in FIG. 1.

The knuckle 24 is additionally rotatably attached to the upper control arm 20 via an adjustable upper rotational attachment 32. Although a variety of upper rotational attachments 32 are contemplated, one embodiment contemplates the use of an upper cross-axis ball joint 34 orientated substantially along the vehicle fore-aft axis and mounted to the knuckle 24. Although a cross-axis ball joint 34 has been described (FIG. 6), standard and/or taylored bushings 35 (FIG. 7) may be used in place of some or all of the cross axis ball joints. Bushings generally comprise a series of elastic and rigid members, including rubber, plastic, urethane and metal. Although a specified ball joint (FIG. 6) and bushing (FIG. 7) have been illustrated, a wide variety of bushings and ball joints are known and contemplated by the present invention. The upper cross-axis ball joint 34 is preferably mounted vertically on the upper surface 35 of the knuckle 24. An upper mount joint 36 formed as a portion of the upper control arm 20 houses an upper control arm shaft 38 that engages the upper cross-axis ball joint 34 to allow the knuckle 24 to move in a vertical direction relative to the vehicle while still receiving support from the upper control arm 20. The upper mount joint 36 is preferably mounted above the knuckle 24 in plane with the upper cross-axis ball joint 34 to allow extended vertical movement of the knuckle 24. The upper mount joint 36 further includes at least one slotted guide 40 in which the upper control arm shaft 38 is positioned (see FIG. 3). The slotted guide 40 is preferably orientated to allow relative uni-directional displacement between the upper control arm 20 and the knuckle 24. Although this may be accomplished in a variety of fashions, one embodiment contemplates orientating the slotted guide 40 in substantially a port-starboard direction relative to the vehicle. In one embodiment, it is contemplated that the upper control arm shaft 38 is formed as a bolt fastener assembly. In other embodiments, however, it is contemplated that the upper control arm shaft 38 may take on a variety of configurations including, but not limited to, automated adjustment mechanisms.

Figure 4:
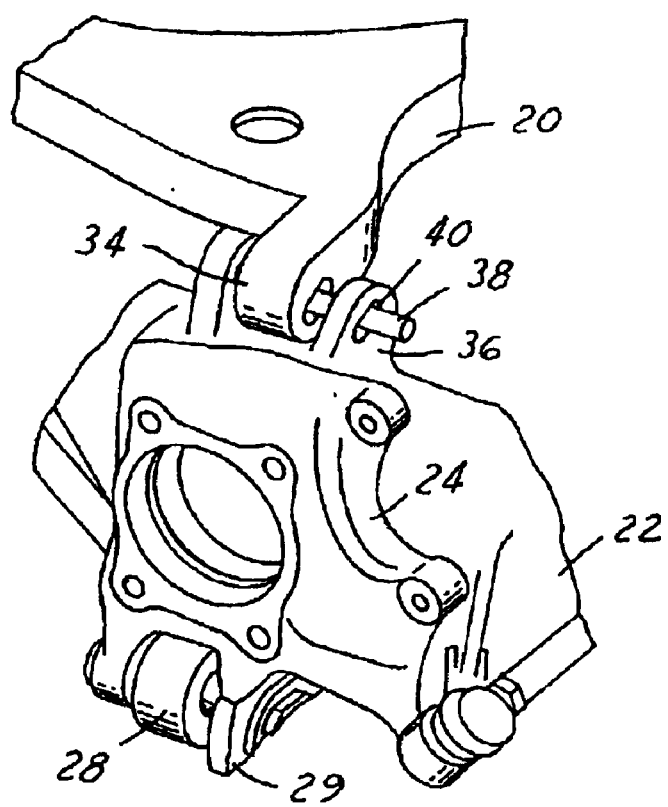
FIG. 4 is an illustration of an alternate embodiment of an automotive suspension assembly in accordance with the present invention, the automotive suspension assembly illustrated with the upper steering knuckle mounted on the upper control arm.

The automotive steering assembly 10 can further incorporate a variety of additional features to improve performance. A plurality of service shim ports 42 can be added to the upper control arm 20. These service shim ports 42 can be utilized for service adjustment of camber through the addition of service shim bolts. Although the service shim ports 42 may take on a variety of forms, one embodiment contemplates the use of bolt holes for service shim ports 42. Upper rear ball joints 44 and lower rear ball joints 46 may also be utilized to rotationally mount the upper control arm 20 and the lower control arm 22, respectively, to the vehicle frame. Although these rear rotational joints 44, 46 are referred to as ball joints it should be understood that a wide variety of rotational joints are contemplated. Additionally, in an alternate embodiment, the upper mount joint 36 may be formed as a portion of the knuckle 24 and the upper cross-axis ball joint 34 may be mounted to the upper control arm 20 without altering the efficiency of the present invention (see FIG. 4). In this scenario, the slotted guide 40 would be located on the knuckle 24 allowing for an identical adjustment of camber 12 as previously described.

Figure 5:
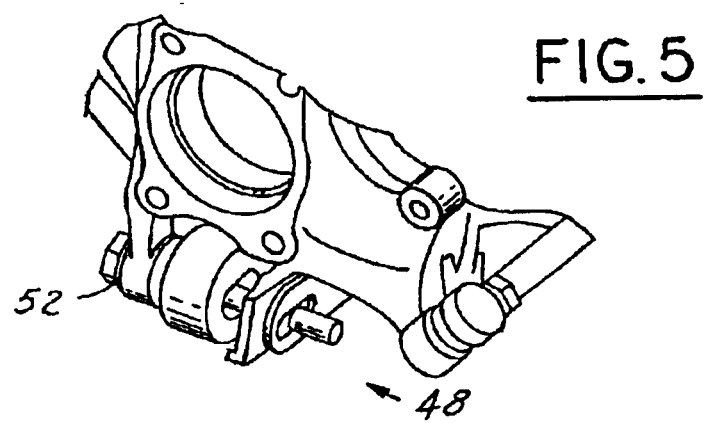
FIG. 5 is an illustration of an alternate embodiment of an automotive suspension assembly in accordance with the present invention, the automotive suspension assembly illustrated with and adjustable lower control arm for adjusting camber.

Although the automotive steering assembly 10 has been described in an upper control arm configuration, modifications to the above described configurations are contemplated. In an alternate embodiment illustrated in FIG. 5 the adjustable rotational attachment 48 may be positioned between the lower control arm 22 and the knuckle 24 while the non-adjustable rotational attachment may be positioned between the upper control arm 20 and the knuckle 24. It should be understood, however, that higher loading can be experienced at the lower rotational attachment 26 and therefore larger clamp loads may be necessary on the adjustable rotational attachment 48 to prevent slip. Additionally, higher clamp loads may require a higher bearing area under the bolt head 52 to prevent brinelling or local deformation of the attachment features. In this embodiment the slot guide 40 would allow uni-directional displacement between the lower control arm 22 and the knuckle 24.

While particular embodiments of the invention have been shown and described, numerous variations and alternative embodiments will occur to those skilled in the art. Accordingly, it is intended that the invention be limited only in terms of the appended claims.

What is claimed is:

1. An automotive suspension assembly comprising:
   a knuckle having a camber;
   a lower control arm rotatably affixed to said knuckle by way of a lower mount joint rotatably engaging a lower rotational joint; and
   an upper control arm rotatably affixed to said knuckle by way of an upper mount joint rotatably engaging an upper rotational joint, said upper rotational joint including an integral upper control arm shaft positioned within a slotted guide, said camber adjustable by adjusting the position of said upper control arm shaft within said slotted guide.

2. An automotive suspension assembly as described in claim 1, wherein said upper control arm shaft is positioned along the rotational axis of said upper rotational joint.

3. An automotive suspension assembly as described in claim 1, wherein said upper mount joint is formed as a portion of said upper control arm and said upper rotational joint is formed as a portion of said knuckle.

4. An automotive suspension assembly as described in claim 1, wherein said upper mount joint is formed as a portion of said knuckle and said upper rotational joint is formed as a portion of said upper control arm.

5. An automotive suspension assembly as described in claim 1, wherein said upper rotational joint comprises a cross-axis ball joint.

6. An automotive suspension assembly as described in claim 1, wherein said upper rotational joint comprises a bushing joint.

7. An automotive suspension assembly as described in claim 1, further comprising:

at least one service shim port formed in said upper control arm.

8. An automotive suspension assembly as described in claim 1, further comprising:
- a plurality of upper rear ball joints affixed to said upper control arm; and
- a plurality of lower rear ball joints affixed to said lower control arm.

9. An automotive suspension assembly as described in claim 1, wherein said upper rear ball joints and said lower rear ball joints comprise cross-axis ball joints.

10. An automotive suspension assembly as described in claim 1, wherein said slotted guide is orientated to provide uni-directional displacement between said upper control arm and said knuckle.

11. An automotive suspension assembly as described in claim 1, wherein said upper control arm shaft comprises a bolt fastener.

12. An automotive suspension assembly comprising:
- a knuckle having a camber;
- an upper control arm rotatably affixed to said knuckle by way of a lower mount joint rotatably engaging an upper rotational joint; and
- a lower control arm rotatably affixed to said knuckle by way of a lower mount joint rotatably engaging a lower rotational joint, said lower mount joint including an integral lower control arm shaft positioned within a slotted guide, said camber adjustable by adjusting the position of said lower control arm shaft within said slotted guide.

13. An automotive suspension assembly as described in claim 12, wherein said lower control arm shaft is positioned along the rotational axis of said lower rotational joint.

14. An automotive suspension assembly as described in claim 12, wherein said lower mount joint is formed as a portion of said lower control arm and said lower rotational joint is formed as a portion of said knuckle.

15. An automotive suspension assembly as described in claim 12, wherein said lower mount joint is formed as a portion of said knuckle and said lower rotational joint is formed as a portion of said lower control arm.

16. An automotive suspension assembly as described in claim 12, wherein said lower rotational joint comprises a cross-axis ball joint.

17. An automotive suspension assembly as described in claim 12, wherein said lower rotational joint comprises a bushing joint.

18. An automotive suspension assembly as described in claim 12, further comprising:
- a plurality of upper rear cross-axis ball joints affixed to said upper control arm; and
- a plurality of lower rear cross-axis ball joints affixed to said lower control arm.

19. An automotive suspension assembly as described in claim 12, wherein said slotted guide is orientated to provide uni-directional displacement between said lower control arm and said knuckle.

20. An automotive suspension assembly as described in claim 12, wherein said upper control arm shaft comprises a bolt fastener.

* * * * *